(12) United States Patent  
Abd Elhamid et al.

(10) Patent No.: US 9,252,411 B2
(45) Date of Patent: Feb. 2, 2016

(54) MULTIFUNCTION BATTERY SEPARATOR

(71) Applicant: GM Global Technology Operations LLC, Detroit, MI (US)

(72) Inventors: Mahmoud H. Abd Elhamid, Troy, MI (US); Xingcheng Xiao, Troy, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 153 days.

(21) Appl. No.: 14/087,448

(22) Filed: Nov. 22, 2013

(65) Prior Publication Data

US 2015/0147641 A1    May 28, 2015

(51) Int. Cl.
 *H01M 2/16* (2006.01)
(52) U.S. Cl.
 CPC .................................. *H01M 2/1613* (2013.01)
(58) Field of Classification Search
 None
 See application file for complete search history.

(56) References Cited

U.S. PATENT DOCUMENTS

| 2005/0031942 | A1* | 2/2005 | Hennige et al. ................ 429/144 |
| 2006/0166085 | A1* | 7/2006 | Hennige et al. ................ 429/128 |
| 2012/0121965 | A1* | 5/2012 | Makino et al. ................ 429/156 |
| 2012/0315384 | A1  | 12/2012 | Abd Elhamid et al. |
| 2013/0131200 | A1  | 5/2013 | Huang |

* cited by examiner

*Primary Examiner* — Patrick Ryan
*Assistant Examiner* — Lucas J O Donnell
(74) *Attorney, Agent, or Firm* — Fraser Clemens Martin & Miller LLC; William A. Ziehler (57) ABSTRACT

Use of a flexible, nonconductive, porous, and thermally tolerant ceramic material as a separator in a lithium-ion battery or lithium-sulfur battery is described. The separator can be made of aluminum oxide and provides excellent mechanical and thermal properties that prevent wear and puncture of the separator caused by particles removed from the electrodes during the charging and discharging process. The separator is designed to mitigate effects of melt shrinkage and facilitate the lithium ion transport, in contrast to separators that include a polymeric material, thus preventing short-circuiting between the positive and the negative electrode. Improved wetting and filling of the separator with electrolyte solution are provided, for improved rate capability of the battery (fast charging and discharging). The separator further reduces the potential for thermal runaway in Li batteries.

20 Claims, 4 Drawing Sheets

MULTIFUNCTION BATTERY SEPARATOR

FIELD OF THE INVENTION

The present technology relates to a separator that is disposed between the anode and cathode of a lithium battery, including a flexible, electrically insulative, porous, and thermally tolerant ceramic material for a lithium-ion battery or a lithium sulfur battery.

BACKGROUND OF THE INVENTION

This section provides background information related to the present disclosure which is not necessarily prior art.

A secondary lithium-ion battery is a rechargeable power source that can be implemented into a wide variety of stationary and portable applications. The structure and electrochemical reaction mechanism of this type of battery provide several desirable characteristics, including a relatively high energy density, a relatively low internal resistance, a general nonappearance of any memory effect as compared to other types of rechargeable batteries (e.g., a nickel-cadmium battery), and a low self-discharge rate. These characteristics make the lithium-ion battery a preferred mobile power source for portable consumer electronics such as laptop computers and cell phones. Larger-scale versions that interact with a multitude of interconnected systems are employed in the automotive industry to improve vehicle fuel efficiency and reduce atmospheric pollution. The powertrains of hybrid electric vehicles (HEV) and extended range electric vehicles (EREV), for example, can rely on the cooperative effort of multiple lithium-ion batteries and a hydrocarbon-fueled internal combustion engine to generate power for vehicle operation.

A lithium-ion battery generally contains one or more electrochemical battery cells that each include a negative electrode, a positive electrode, and a porous separator sandwiched between confronting inner face surfaces of the electrodes. Each of these battery components is wetted with a liquid electrolyte solution that can communicate lithium ions. The negative and positive electrodes are formed of different materials that can intercalate and de-intercalate lithium ions and, when connected, establish an electrochemical potential difference. An interruptible external circuit connects the negative electrode and the positive electrode to provide an electrical current path around the separator to electrochemically balance the migration of lithium ions through the separator between the electrodes. Metallic current collectors intimately associated with each electrode supply and distribute electrons to and from the external circuit depending on the operating state of the electrochemical battery cell. The external circuit can be coupled to an electrical load (during discharge) or an applied voltage from an external power source (during charging) through conventional electronic connectors and related circuitry.

The porous separator includes opposed major face surfaces that intimately contact the confronting inner face surfaces of the electrodes. Functions of the separator include providing a porous and electrically insulative mechanical support barrier between the negative and positive electrodes to prevent a short-circuit. Conventionally, the porous separator has been composed of a polyolefin such as polyethylene and/or polypropylene. A number of fabrication methods exist for making a polyolefin separator with its intended porosity. For example, the separator can be formed by a dry technique in which a polyolefin polymer is melted, extruded into a film, annealed, and then uniaxially stretched. The separator can also be formed by a wet technique in which a polyolefin polymer is mixed with a hydrocarbon or other low-molecular weight liquid substance. The mixture is then heated, melted, extruded into a sheet, and biaxially stretched. Afterwards, the hydrocarbon or other low-molecular weight liquid substance is extracted.

A polyolefin separator, however, can be susceptible to certain performance declines when heated excessively. Exposure of the electrochemical battery cell to temperatures of 80° C. and above can cause the polyolefin separator to shrink, soften, and even melt. Such high temperatures can be attributed to charging-phase heat generation, ambient atmospheric temperature, or some other source, Physical distortion of the polyolefin separator can ultimately permit direct electrical contact between the negative and positive electrodes and cause the electrochemical cell to short-circuit. Battery thermal runaway is also a possibility if the electrodes come into direct electrical contact with one another. The inability of a polyolefin separator to maintain thermal stability at temperatures exceeding 80° C. for prolonged periods can be a limitation in certain lithium-ion battery applications.

SUMMARY OF THE INVENTION

The present technology includes systems, processes, compositions, and articles of manufacture that relate to a separator comprising a flexible, electrically insulative, porous, and thermally tolerant ceramic material for use in an electrochemical battery cell, such as a lithium-ion battery or a lithium-sulfur battery.

In some embodiments, an electrochemical battery cell is provided that includes a separator disposed between two electrodes. The separator comprises a flexible, electrically insulative, porous, and thermally tolerant ceramic material that does not include an organic polymer. The electrochemical battery cell comprises a lithium-ion battery cell or a lithium-sulfur battery cell.

In various embodiments, a battery is provided that includes a plurality of electrochemical battery cells. At least one of the electrochemical battery cells includes a separator and an electrolyte, where the separator is disposed between two electrodes. The separator comprises a flexible, electrically insulative, porous, and thermally tolerant ceramic material that does not include an organic polymer. The battery comprises one of a lithium-ion battery and a lithium-sulfur battery.

In certain embodiments, a method of making an electrochemical battery cell is provided that includes disposing a separator between two electrodes. The separator comprises a flexible, electrically insulative, porous, and thermally tolerant ceramic material that does not include an organic polymer. The electrochemical battery cell comprises a lithium-ion battery cell or a lithium-sulfur battery cell.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION OF EXEMPLARY

Embodiments of the Invention

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments where possible. Except where otherwise expressly indicated, all numerical values or quantities in this description are to be understood as modified by the word "about" in describing the broadest scope of the technology.

The present technology relates to a separator for a lithium battery, such as a lithium-ion battery or a lithium-sulfur battery, where the separator includes a flexible, electrically insulative, porous, and thermally tolerant ceramic material that optimizes durability of the battery. The separator can be configured as a permeable membrane that is positioned between the electrodes (e.g., an anode and a cathode) of the battery. The separator is electrically insulative and can operate to keep the electrodes spaced apart, preventing physical contact between the electrodes, thereby militating against an electrical short circuit in the battery. The separator is also permeable to allow transport of ionic charge carriers therethrough (e.g., lithium ions), which complete an electrical circuit during a passage of current in the electrochemical cell. The separator, while flexible, can also provide adequate mechanical strength (e.g., high through-plane puncture resistance and in-plane tensile strength), dimensional stability, and resistance to thermal shrinkage. The separator can be generally fire retardant in the event of a thermal runaway event. Use of the present separator can consequently increase the robustness and thermal tolerance of a battery design.

The description herein generally refers to use of the separator in a lithium-ion battery. However, it should be noted that the separator can be used in a lithium-sulfur battery. Briefly, chemical processes in the lithium sulfur cell can include lithium dissolution from the anode surface (and incorporation into alkali metal polysulfide salts) during discharge, and reverse lithium plating to the anode while charging. Sulfur polymers are reduced on the cathode surface as the cell discharges and sulfur polymers form at the cathode as the cell charges. This is different from a lithium-ion battery, where the lithium ions are intercalated in the anode and cathodes. In certain cases, a lithium sulfur battery can provide for a higher lithium storage density than a lithium-ion battery.

The separator can comprise a ceramic material, where the ceramic material includes a metal oxide, a metal nitride, and/or a metal carbide. Examples of suitable metal oxides include aluminum oxide, zirconium oxide, silicon oxide, calcium oxide, magnesium oxide, titanium oxide, tantalum oxide, and combinations thereof, examples of metal nitrides include silicon nitride, cubic boron nitride, aluminum nitride, chromium nitride, and titanium nitride, while examples of metal carbides include silicon carbide, boron carbide, titanium carbon, and chromium carbide. Other metal oxides, metal nitrides, metal carbides and combinations thereof can also be used. In certain embodiments, the ceramic material is aluminum oxide. The ceramic material provides improved mechanical and thermal properties over polyolefin separator materials, for example. The ceramic material is also substantially electrically nonconductive (i.e., electrically insulative) making the separator suitable for use in a lithium-ion battery. Furthermore, the ceramic material is tolerant to low temperatures and high temperatures; e.g., up to about 1650° C. (about 3000° F.) for aluminum oxide.

As described, the separator comprises a flexible, electrically insulative, porous, and thermally tolerant ceramic material. The separator can also be free of any organic polymeric materials (e.g., polyolefins such as polyethylene and/or polypropylene). In particular, the present separator is not formed by coating or depositing the ceramic material onto a polymeric separator. In this way, the separator is thermally tolerant to temperatures that could adversely affect such organic polymeric materials. The ceramic material is tolerant to high temperatures (as related to thermal runaway) and provides a higher melting point and a higher dielectric strength.

The ceramic material includes metal oxide, metal nitride, and/or metal carbide fibers (e.g., aluminum oxide fibers) that are woven together to form a flexible paper-like material. These flexible ceramic sheets or papers have excellent chemical resistance to both reducing and oxidizing conditions. They offer good thermal stability (e.g., melting points from about 1760-1982° C. or about 3200-3600° F.), good dielectric strength (e.g., about 100 volt/mil), and good mechanical and thermal shock resistances. Different from other ceramic materials, the current flexible ceramic sheets can be handled easily and can be cut or made into complex shapes. The ceramic material can be made from woven flexible ceramic fibers. Some organic additives can be added to hold the fibers in place and to form sheets or papers of the fibers. The organic binders can then be removed at high temperatures leaving behind coherent structures of the flexible fibers without any organic polymeric materials. Therefore, in certain cases, the ceramic material can be woven then sintered at high temperature to remove any binders or other materials.

The ceramic material, such as aluminum oxide, provides a surface that is resilient to most chemicals including various electrolytes used in lithium batteries. Contact angle between the electrolyte and the ceramic material can be less than 10 degrees (extremely hydrophilic) in some embodiments. This can facilitate filling and wetting of battery cells during manufacture.

In some embodiments, the separator can comprise a ceramic material such as Ultra Temp 300 and/or Ultra Temp 390 made by Cotronics Corporation (Brooklyn, N.Y.).

The separator has sufficient pore density to hold liquid electrolyte and enable ions to move between the electrodes. In certain embodiments, separator porosity can be about 40% to about 80%. In other embodiments, the porosity can be about 60%. Porosity can be measured using various liquid or gas absorption methods depending on the pore size.

Pore size of the separator is generally smaller than any particle size of the electrode components, including active materials and conducting additives. In this fashion, the separator prevents migration of any electrode material therethrough. Ideally, the pores should be uniformly distributed while also having a tortuous structure. This ensures a uniform current distribution throughout the separator while suppressing the growth of lithium on the anode. Distribution and structure of pores can be determined using a capillary flow porometer or a scanning electron microscope, for example. Embodiments of the present separators can have pore sizes ranging from about 0.001 µm to about 12 µm. A particular embodiment includes porosity of about 60% with a pore size of about 0.004 µm to about 10.556 µm.

The separator pore density and pore size provide a permeability for the transport of ionic charge carriers (e.g., lithium ions) through the separator. Typically, it is desirable to provide the separator with uniform permeability across the surface thereof to optimize battery life following repeated charging and discharging cycles. Deviations from uniform permeability, for example, can produce uneven current density distribution, which in certain instances can cause the formation of crystals on the anode.

The separator is also wettable so that an electrolyte can substantially fill the membrane and effectively allow the ionic charge carriers to pass through the pores. The wettable nature of the separator can also improve fabrication of the battery by improving electrolyte filling of the battery assembly. Furthermore, it can be desirable for the electrolyte to permanently wet the separator in order to sustain battery life.

Materials used in forming the separator, including the ceramic material (e.g., metal oxide), can be selected to be chemically and thermally stable with respect to the chosen electrolyte, electrode materials, and under the strongly reactive environments experienced when the battery is charged. Namely, aspects of the separator can be tailored so that the separator maintains performance during a designated battery lifetime. The separator, for example, can be formed from materials that are stable over a wide temperature range without exhibiting substantial dimensional changes, such as shrinking, stretching, or distorting in some manner. Thickness and mechanical strength of the separator can also be optimized for certain applications. The separator can be thin to facilitate the battery's energy and power densities. However, a separator that is too thin can compromise mechanical strength and safety. Separator thickness is substantially uniform to support many charging cycles. The separator thickness is selected to be strong enough to withstand any tension or other forces experienced during battery fabrication; e.g., a winding or compression operation during battery assembly. Mechanical strength can be defined in terms of the tensile strength in both a machine (winding) direction and a transverse direction and in terms of tear resistance and puncture strength. For example, such parameters can be defined in terms of Young's modulus, fracture strength, and fracture toughness.

Another aspect of the separator is the ability to prevent a thermal runaway event. As the separator is formed of a thermally tolerant ceramic material, the ceramic material (e.g., metal oxide) can tolerate higher temperatures than various polymeric separators used in lithium-ion batteries. The thermally tolerant ceramic material can therefore reduce the likelihood of a thermal runaway event caused by mechanical failure of the separator. In particular, the ceramic material will not melt or fail at temperatures that may compromise a polymer based separator; e.g., the separator can be stable up to about 1650° C. (about 3000° F.) when aluminum oxide is used.

The separator constructed according to the present technology provides several benefits and advantages over other types of separators, including polyolefin separators. Such benefits and advantage include uniformity and good mechanical properties that prevent wear and puncture of the separator caused by particles removed from the electrodes during the charging and discharging process. Good structural integrity is maintained even when the separator is made thin. For example, the separator can be constructed having a thickness from about 25 microns to about 100 microns. The separator further mitigates the consequences of melt shrinkage, in contrast to polymeric separator materials, thus preventing short-circuiting between the electrodes. Improved wetting and filling of the separator with electrolyte solution based on better wettability characteristics results in an improved rate capability of the battery; i.e., fast charging and discharging. Improved thermal properties are also provided that can reduce or eliminate thermal runaway in lithium-ion batteries. For example, a separator of aluminum oxide can provide stablility up to about 1650° C. (about 3000° F.). The present separator therefore will not melt in the fashion of a polyolefin-based separator and can hence prevent thermal runaway upon experiencing heat that would compromise a typical polyolefin separator. Certain aspects of the separator can additionally serve as a hydrogen fluoride (HF) scavenger, for example, to mitigate the dissolution of Mn and other transitional metals. Depending on the electrochemistry employed in the battery, water in the electrolyte and solvent can result in the formation of HF, where HF can be detrimental to the performance of lithium-ion batteries. The present separator including ceramic (e.g., metal oxide) can scavenge HF if and when it is formed.

EXAMPLES

Figure 1:
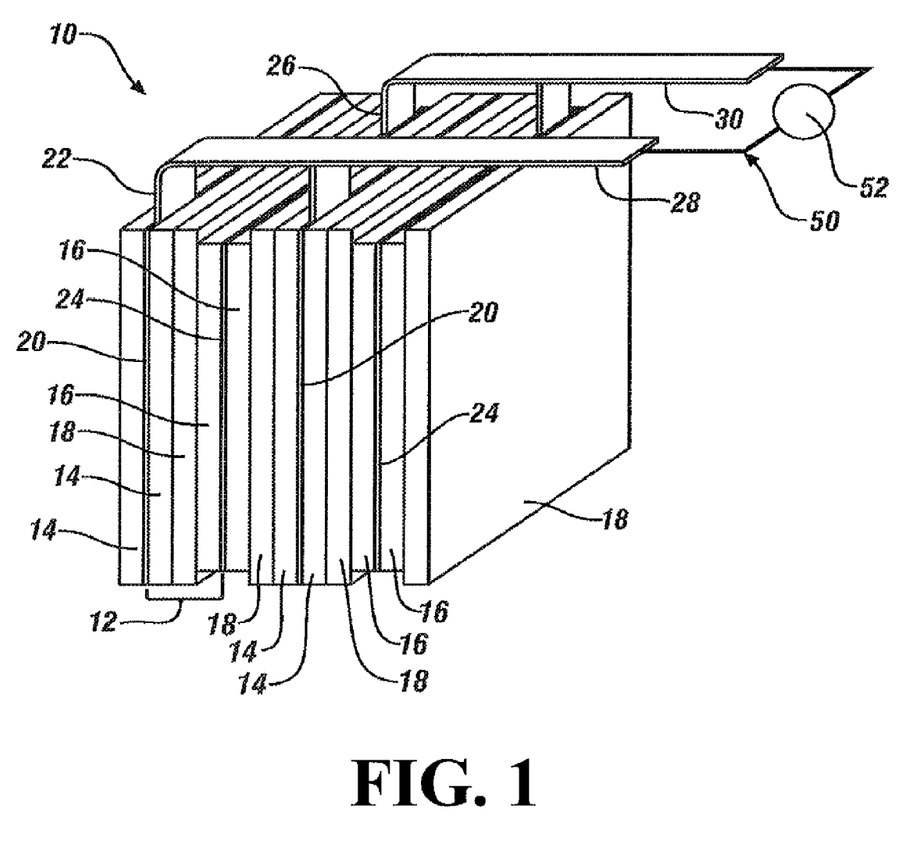
FIG. 1 illustrates a generalized perspective view of a lithium ion battery that includes several adjacent electrochemical battery cells, each of which includes a negative electrode, a positive electrode, and a separator sandwiched between the two electrodes.
Figure 2:
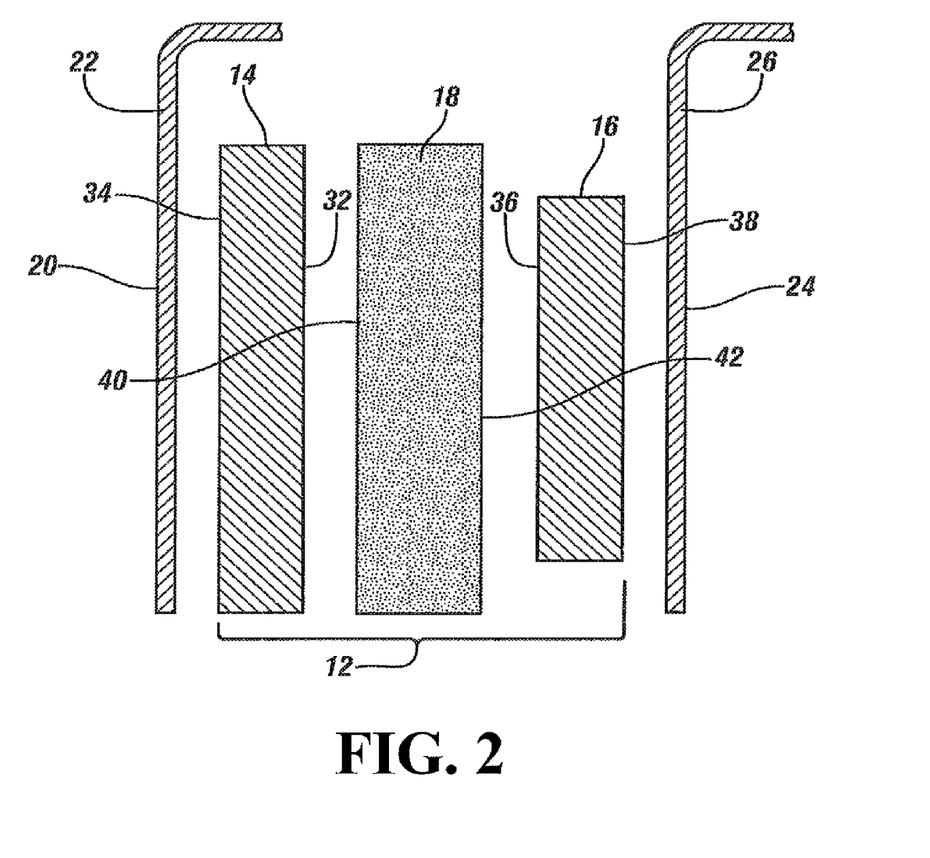
FIG. 2 illustrates an exploded cross-sectional view of one of the electrochemical battery cells shown in FIG. 2 along with its associated metallic current collectors.

A separator constructed according to the present disclosure can be used in a wide variety of lithium-ion battery configurations. An exemplary and generalized illustration of a lithium-ion battery 10 is depicted in FIG. 1, where the components of the lithium-ion battery 10 are idealized representations that are not necessarily drawn to scale. The lithium-ion battery 10 shown includes several rectangularly-shaped electrochemical battery cells 12 that are each bracketed by metallic current collectors. A plurality of electrochemical battery cells 12 (e.g., from 5 to 150) can be stacked side-by-side in a modular configuration and connected in series, although a parallel connection is also permitted, if the lithium-ion battery 10 is intended for use as part of a vehicle powertrain. The lithium-ion battery 10 can also be further connected serially or in parallel to other similarly constructed lithium-ion batteries to form a lithium-ion battery pack that exhibits the voltage and current capacity demanded for a particular vehicle application. It should be understood the lithium-ion battery 10 shown here is only a schematic illustration. The electrochemical battery cell 12 shown in FIG. 2 is not intended to inform the relative sizes of the components of the electrochemical battery cell 12 or to limit the wide variety of structural configurations the lithium-ion battery 10 can assume. Various structural modifications to the lithium-ion battery 10 shown in FIG. 2 are possible despite what is explicitly illustrated.

The electrochemical battery cell 12 includes a negative electrode 14, a positive electrode 16, and a separator 18 situated between the two electrodes 14, 16. The separator 18 can comprise any of the various flexible ceramic separators disclosed herein. Each of the negative electrode 14, the positive electrode 16, and the separator 18 is wetted with a liquid electrolyte solution that is able to communicate lithium ions. A negative-side metallic current collector 20 that includes a negative polarity tab 22 is located between the negative electrodes 14 of adjacent electrochemical cells 12. Likewise, a positive-side metallic current collector 24 that includes a positive polarity tab 26 is located between neighboring positive electrodes 16. The negative polarity tab 22 is electrically coupled to a negative terminal 28 and the positive polarity tab 26 is electrically coupled to a positive terminal 30. An applied compressive force can be used to press the metallic current collectors 20, 24 against the electrodes 14, 16 and the electrodes 14, 16 against the separator 18 to achieve intimate interfacial contact between the several contacting components. At least one, and preferably all, of the separators 18 employed in the electrochemical battery cells 12 of the lithium-ion battery 10 can be constructed using the various flexible ceramic separators as disclosed herein.

An exploded cross-sectional view of the electrochemical battery cell 12 and its associated metallic current collectors 20, 24 is generally illustrated in FIG. 2, where the components of the electrochemical battery cell 12 are idealized representations that are not necessarily drawn to scale. The negative electrode 14 includes an inner face surface 32 and an outer face surface 34 relative to the location of the separator 18. The positive electrode 14 similarly includes an inner face surface 36 and an outer face surface 38. The inner face surface 32 of the negative electrode 14 can, but is not required to, encompass a larger two-dimensional surface area than the inner face surface 36 of the positive electrode 16, as shown. When assembled into the electrochemical battery cell 12, the inner face surfaces 32, 36 of the negative and positive electrodes 14, 16 confront one another and are pressed against a negative-side major face surface 40 and a positive-side major face surface 42 of the separator 18, respectively. Such pressed-engagement occurs generally uniformly along the entire interface of the major face surfaces 40, 42 of the separator 18 and the corresponding portions of the inner face surfaces 32, 36 of the electrodes 14, 16. The negative-side metallic current collector 20 supports the outer face surface 34 of the negative electrode 14 and the positive-side metallic current collector 24 supports the outer face surface 38 of the positive electrode 16. Both of the metallic current collectors 20, 24 engage their respective electrode outer face surfaces 34, 38 over an appreciable interfacial surface area to facilitate the efficient collection and distribution of free electrons.

The electrochemical battery cell 12 is generally thin and flexible. A typical thickness of the electrochemical battery cell 12 extending from the outer face surface 34 of the negative electrode 12 to the outer face surface 38 of the positive electrode 16 is about 70 µm to about 350 µm. Each electrode 14, 16 is preferably about 30 µm to 150 µm thick and, as already mentioned, the separator 18 is about 10 µm to 50 µm thick. The metallic current collectors 20, 24 are normally about 5 µm to 20 µm thick. The relatively thin and flexible nature of the electrochemical battery cell 12 and its associated metallic current collectors 20, 24 allows them to be rolled, folded, bent, or otherwise maneuvered into a variety of lithium-ion battery configurations depending on design specifications and spatial constraints. The lithium-ion battery 10 can, for example, include a number of distinct electrochemical battery cells 12 that have been fabricated, cut, aligned, and placed next to one another or, in an alternative embodiment, the cells 12 can be derived from a continuous layer that is folded back-and-forth over itself many times.

The negative electrode 14 includes a lithium host material that stores intercalated lithium at a relatively low electrochemical potential (relative to a lithium metal reference electrode) such as, for example, graphite or lithium titanate. The lithium host material can be intermingled with a polymeric binder material to provide the negative electrode 14 with structural integrity. The lithium host material can be graphite and the polymeric binder material can be one or more of polyvinyldiene fluoride (PVdF), an ethylene propylene diene monomer (EPDM) rubber, styrene butadiene rubber (SBR), a carboxymethoxy cellulose (CMC), or mixtures thereof. Graphite is normally used to make the negative electrode 14 due to it being relatively inert and the fact that the layered structure of graphite exhibits favorable lithium intercalation and de-intercalation characteristics that help provide the electrochemical battery cell 12 with a suitable energy density. Commercial forms of graphite that can be used to construct the negative electrode 14 are available from Timcal Graphite and Carbon (Bodio, Switzerland), Lonza Group (Basel, Switzerland), and Superior Graphite (Chicago, Ill.). The negative-side metallic current collector 20 associated with the negative electrode 14 can be a thin-film copper foil that coextensively contacts the outer face surface 34 of the negative electrode 14.

The positive electrode 16 includes a lithium-based active material that stores intercalated lithium at a higher electrochemical potential than the lithium host material used to make the negative electrode 14 (also relative to a lithium metal reference electrode). The same polymeric binder materials that can be used to construct the negative electrode 14 (PVdF, EPDM, SBR, CMC) can also be intermingled with the lithium-based active material to provide the positive electrode 16 with structural integrity. The lithium-based active material can be a layered lithium transition metal oxide, such as lithium cobalt oxide ($LiCoO_2$), a spinel lithium transition metal oxide, such as spinel lithium manganese oxide ($LiMn_2O_4$), a lithium polyanion, such as a nickel-manganese-cobalt oxide [$Li(Ni_xMn_yCo_z)O_2$], lithium iron phosphate ($LiFePO_4$), or lithium fluorophosphate ($Li_2FePO_4F$), or a mixture of any of these materials. Some other suitable lithium-based active materials that can be employed as all or part of the lithium-based active material include lithium nickel oxide ($LiNiO_2$), lithium aluminum manganese oxide ($Li_xAl_yMn_{1-y}O_2$), and lithium vanadium oxide ($LiV_2O_6$), to name but a few alternatives. The positive-side metallic current collector 24 associated with the positive electrode 16 is preferably a thin-film aluminum foil that coextensively contacts the outer face surface 38 of the positive electrode 16.

The separator 18 functions as a flexible, thin, and electrically insulative mechanical barrier layer that physically separates the confronting inner face surfaces 32, 36 of the electrodes 14, 16 to prevent a short-circuit in the electrochemical battery cell 12. The separator 18 is also sufficiently porous to permit infiltration of the liquid electrolyte solution and the internal passage of dissolved lithium ions. A rise in temperature that breaches 80° C. in the electrochemical battery cell 12 can be endured by the separator 18 without a sacrifice in functionality. In particular, where the separator 18 includes a ceramic material such as aluminum oxide, the aluminum oxide can endure temperatures up to about 1650° C. (about 3000° F.). Dimensional shrinkage is also avoided because the manufacture of the separator 18 does not require significant stretching to form the network pore openings, as is often the case with polyolefin separators. The ability of the separator 18 to withstand potential spikes in temperature provides the electrochemical battery cell 12 with durability and helps prevent short-circuit events that can cause the cell 12 to lose capacity or fail altogether.

The liquid electrolyte solution infiltrated into the separator 18, and which wets both electrodes 14, 16, can be a lithium salt dissolved in a non-aqueous solvent. Some suitable lithium salts that can be used to make the liquid electrolyte solution include $LiClO_4$, $LiAlCl_4$, $LiI$, $LiBr$, $LiSCN$, $LiBF_4$, LiB(C$_6$H$_5$)$_4$, LiAsF$_6$, LiCF$_3$SO$_3$, LiN(CF$_3$SO$_2$)$_2$, LiPF$_6$, and a mixture that includes one or more of these salts. The non-aqueous solvent in which the lithium salt is dissolved can be a cyclic carbonate (e.g., ethylene carbonate, propylene carbonate), an acyclic carbonate (e.g., dimethyl carbonate, diethyl carbonate, ethylmethylcarbonate), an aliphatic carboxylic ester (e.g., methyl formate, methyl acetate, methyl propionate), a γ-lactone (e.g., γ.-butyrolactone, γ-valerolactone), an acyclic ether (e.g., 1,2-dimethoxyethane, 1,2-diethoxyethane, ethoxymethoxyethane), a cyclic ether (e.g., tetrahydrofuran, 2-methyltetrahydrofuran), or a mixture that includes one or more of these solvents.

Referring again to FIG. 2, the negative and positive terminals 28, 30 of the lithium-ion battery 10 can be connected to an electrical device 52 as part of an interruptible circuit 50 established between the negative electrodes 14 and the positive electrodes 16 of the many electrochemical battery cells 12. The electrical device 52 can be a wide variety of electrical loads and power-generating devices. An electrical load is a power-consuming device that is powered fully or partially by the lithium-ion battery 10. Conversely, a power-generating device is one that charges or re-powers the lithium-ion battery 10 through an applied external voltage. The electrical load and the power-generating device can be the same device in some instances. For example, the electrical device 52 can be an electric motor for a hybrid electric or an extended range electric vehicle that is designed to draw an electric current from the lithium-ion battery 10 during acceleration and provide a regenerative electric current to the lithium-ion battery 10 during deceleration. The electrical load and the power-generating device can also be different devices. For example, the electrical load can be an electric motor for a hybrid electric or an extended range electric vehicle and the power-generating device can be an AC wall outlet, an internal combustion engine, and/or a vehicle alternator.

The lithium-ion battery 10 can provide a useful electrical current to the electrical device 52 by way of reversible electrochemical reactions that occur in the electrochemical battery cells 12 when the interruptible circuit 50 is closed to connect the negative terminal 28 and the positive terminal 30 at a time when the negative electrodes 14 contain a sufficient quantity of intercalated lithium (i.e., battery discharge). The electrochemical potential difference between the negative electrode 14 and the positive electrode 16 in each cell 12—approximately 2.5 to 4.3 V depending on the composition of the electrodes 14, 16—drives the oxidation of intercalated lithium contained in the negative electrodes 14. Free electrons produced by this oxidation reaction are collected by the negative-side current collectors 20 and supplied to the negative terminal 28. A flow of free electrons is harnessed and directed through the electrical device 52 from the negative terminal 28 to the positive terminal 30 and eventually to the positive electrodes 16 by way of the positive-side current collectors 24. Lithium ions, which are also produced at the negative electrodes 14, are concurrently carried through the separators 18 by the liquid electrolyte solution in route to the positive electrodes 16. The flow of free electrons through the electrical device 52 from the negative terminal 28 to the positive terminal 30 can be continuously or intermittently provided until the negative electrodes 14 are depleted of intercalated lithium and the capacity of the electrochemical battery cells 12 is spent.

The lithium-ion battery 10 can be charged or re-powered at any time by applying an external voltage originating from the electrical device 52 to the electrochemical battery cells 12 to reverse the electrochemical reactions that occur during discharge. The applied external voltage compels the otherwise non-spontaneous oxidation of intercalated lithium contained in the positive electrodes 16 to produce free electrons and lithium ions. The free electrons are collected by the positive-side current collectors 24 and supplied to the positive terminal 30. A flow of the free electrons is directed to the negative terminal 28 and eventually to the negative electrodes 14 by way of the negative-side current collectors 20. The lithium ions are concurrently carried back through the separators 18 in the liquid electrolyte solution towards the negative electrodes 14. The lithium ions and the free electrons eventually reunite and replenish the negative electrodes 14 with intercalated lithium to prepare the electrochemical battery cells 12 for another discharge phase.

Figure 3:
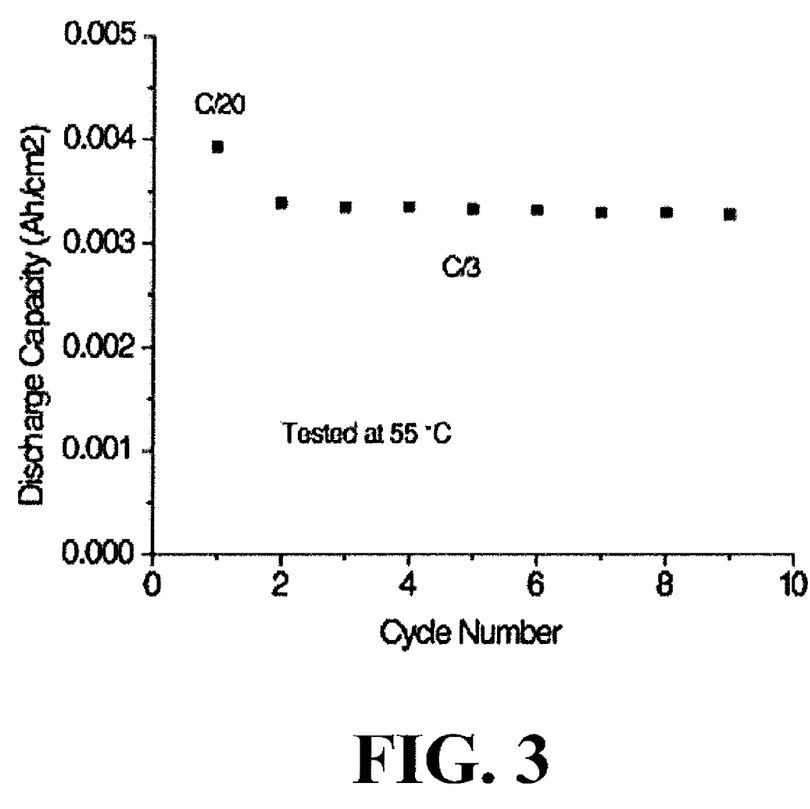
FIG. 3 graphically depicts cycle number relative to discharge capacity at 55° C. for a coin cell constructed with a ceramic separator according to the present technology.
Figure 4:
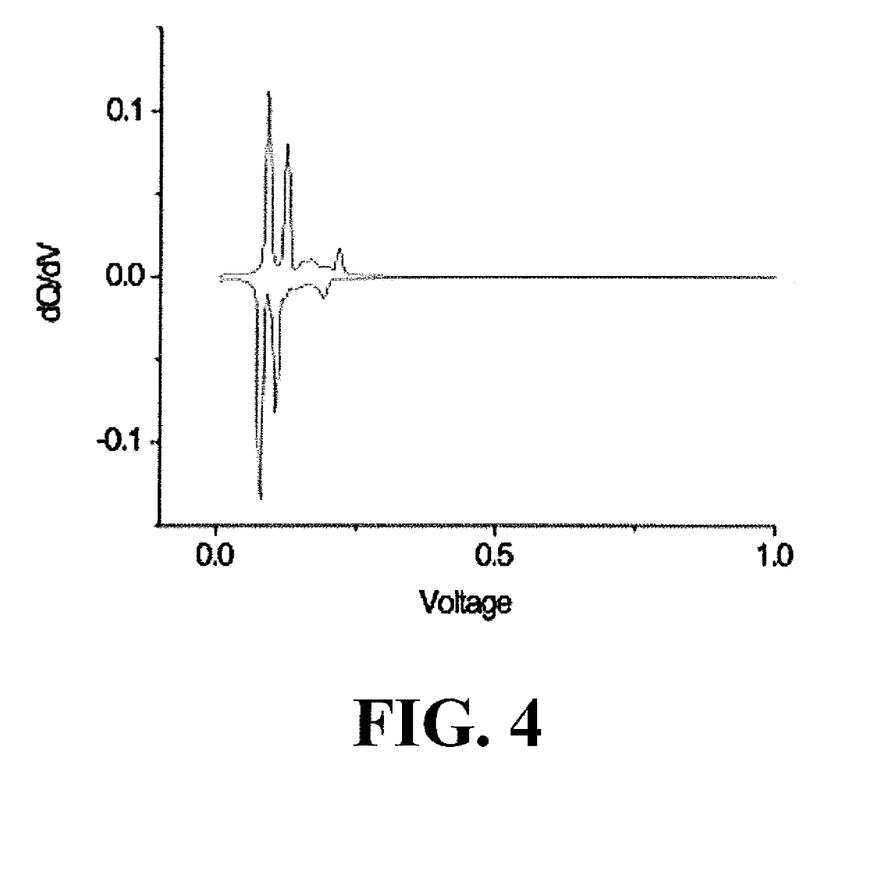
FIG. 4 graphically depicts voltage relative to differential capacity (dQ/dV) for the same coin cell constructed with a ceramic separator according to the present technology.

A lithium-ion coin cell was constructed using a separator 18 comprising aluminum oxide that is constructed according to the present disclosure. The coin cell was tested for cycle stability and Li intercalation and de-intercalation processes at 55° C., with graphite versus lithium metal electrodes. With reference now to FIG. 3, cycle number is plotted relative to discharge capacity at 55° C. for the coin cell. The cell shows much improved cycle stability, as compared to when the cell is constructed with a polymeric separator. Turning to FIG. 4, voltage is plotted relative to differential capacity (dQ/dV) for the same coin cell. The graphite half cell shows the characteristic peaks corresponding to the Li intercalation and de-intercalation processes. The peak shift is minimal, indicating the internal resistance induced by the porous Al$_2$O$_3$ separator is small.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. An electrochemical battery cell comprising:
   a separator disposed between two electrodes, the separator comprising a flexible, electrically insulative, porous, woven, and thermally tolerant ceramic material, wherein the separator does not include an organic polymer and the separator has a porosity of about 60% and a pore size of about 0.004 µm to about 10.556 µm;
   wherein the electrochemical battery cell comprises one of a lithium-ion battery cell and a lithium-sulfur battery cell.

2. The electrochemical battery cell of claim 1, wherein the separator includes a ceramic material selected from the group consisting of a metal oxide, a metal nitride, a metal carbide, and combinations thereof.

3. The electrochemical battery cell of claim 2, wherein the ceramic material is a member selected from a group consisting of aluminum oxide, zirconium oxide, silicon oxide, calcium oxide, magnesium oxide, titanium oxide, tantalum oxide, silicon nitride, cubic boron nitride, aluminum nitride, chromium nitride, titanium nitride, silicon carbide, boron carbide, titanium carbon, chromium carbide, and combinations thereof.

4. The electrochemical battery cell of claim 1, wherein the separator is thermally stable to about 1650° C.

5. The electrochemical battery cell of claim 1, wherein the separator is permeable to lithium ions.

6. The electrochemical battery cell of claim 1, wherein the separator is wettable with a non-aqueous electrolyte having a lithium salt dissolved therein with contact angle of less than about 10 degrees.

7. The electrochemical battery cell of claim 1, wherein one of the electrodes is a negative electrode comprising a lithium host material capable of storing intercalated lithium and the other of the electrodes is a positive electrode comprising a lithium-based active material capable of storing intercalated lithium at a higher electrochemical potential than the lithium host material of the negative electrode.

8. A battery comprising:
a plurality of electrochemical battery cells, wherein at least one electrochemical battery cell includes:
a separator disposed between two electrodes, the separator comprising a flexible, electrically insulative, porous, woven, and thermally tolerant ceramic material, wherein the separator does not include an organic polymer and the separator has a porosity of about 60% and a pore size of about 0.004 µm to about 10.556 µm; and
an electrolyte;
wherein the battery comprises one of a lithium-ion battery and a lithium-sulfur battery.

9. The battery of claim 8, wherein the separator includes a ceramic material selected from the group consisting of a metal oxide, a metal nitride, a metal carbide, and combinations thereof.

10. The battery of claim 9, wherein the ceramic material is a member selected from a group consisting of aluminum oxide, zirconium oxide, silicon oxide, calcium oxide, magnesium oxide, titanium oxide, tantalum oxide, silicon nitride, cubic boron nitride, aluminum nitride, chromium nitride, titanium nitride, silicon carbide, boron carbide, titanium carbon, chromium carbide, and combinations thereof.

11. The battery of claim 8, wherein the separator is thermally stable to about 1650° C.

12. The battery of claim 8, wherein the separator is permeable to lithium ions.

13. The battery of claim 8, wherein the electrolyte comprises a non-aqueous electrolyte having a lithium salt dissolved therein.

14. The battery of claim 8, wherein one of the electrodes is a negative electrode comprising a lithium host material capable of storing intercalated lithium and the other of the electrodes is a positive electrode comprising a lithium-based active material capable of storing intercalated lithium at a higher electrochemical potential than the lithium host material of the negative electrode.

15. A method of making an electrochemical battery cell comprising:
disposing a separator between two electrodes, the separator comprising a flexible, electrically insulative, porous, woven, and thermally tolerant ceramic material, wherein the separator does not include an organic polymer and the separator has a porosity of about 60% and a pore size of about 0.004 µm to about 10.556 µm;
wherein the electrochemical battery cell comprises one of a lithium-ion battery cell and a lithium-sulfur battery cell.

16. The method of claim 15, wherein the separator includes a ceramic material selected from the group consisting of a metal oxide, a metal nitride, a metal carbide, and combinations thereof.

17. The method of claim 15, wherein the separator is thermally stable to about 1650° C.

18. A vehicle comprising a battery according to claim 8.

19. The electrochemical battery cell of claim 1, wherein the separator is uncoated.

20. The battery of claim 8, wherein the separator is uncoated.

\* \* \* \* \*